United States Patent
Yueksel et al.

[11] Patent Number: 5,830,260
[45] Date of Patent: Nov. 3, 1998

[54] PROCESS FOR CLEANING THE WASTE GAS FROM DRYING PROCESSES USING HEATED GAS

[75] Inventors: Levent Yueksel, Duesseldorf; Wilhelm Johannisbauer, Erkrath; Katrin Burmeister; Heike Fleischmann, both of Hilden, all of Germany

[73] Assignee: Henkel Kommanditgesellschaft auf Aktien, Duesseldorf, Germany

[21] Appl. No.: 718,558

[22] PCT Filed: Mar. 20, 1995

[86] PCT No.: PCT/EP95/01028

§ 371 Date: Oct. 21, 1996

§ 102(e) Date: Oct. 21, 1996

[87] PCT Pub. No.: WO95/26487

PCT Pub. Date: Oct. 5, 1995

[30] Foreign Application Priority Data

Mar. 28, 1994 [DE] Germany .......................... 44 10 694.7

[51] Int. Cl.⁶ .............................. B01D 53/14; B01D 5/00; B01D 47/06
[52] U.S. Cl. .................................. 95/42; 95/169; 95/188; 95/204; 95/237
[58] Field of Search ................................ 95/42, 154, 156, 95/169, 180, 188, 190, 204, 208, 237

[56] References Cited

U.S. PATENT DOCUMENTS

| 3,651,617 | 3/1972 | Hodgson | 95/188 |
| 4,265,642 | 5/1981 | Mir et al. | 95/154 |
| 4,772,295 | 9/1988 | Kato et al. | 95/237 X |
| 5,492,626 | 2/1996 | Uenoyama et al. | 95/188 X |

FOREIGN PATENT DOCUMENTS

| 0121357 | 10/1984 | European Pat. Off. . |
| 0324566 | 7/1989 | European Pat. Off. . |
| 0361201 | 4/1990 | European Pat. Off. . |
| 0541009 | 5/1993 | European Pat. Off. . |
| 4116576 | 11/1992 | Germany . |
| 4125471 | 2/1993 | Germany . |
| 4326468 | 2/1995 | Germany . |
| 57-053083 | 4/1980 | Japan . |

*Primary Examiner*—Robert Spitzer
*Attorney, Agent, or Firm*—Ernest G. Szoke; Wayne C. Jaeschke; Real J. Grandmaison

[57] ABSTRACT

The waste gas accumulating in the drying of products containing volatile ingredients is cooled, the condensate obtained is subjected to crossflow membrane filtration and part of the cleaned waste gas is returned to the drying process. The concentrate obtained is put to a material, thermal or other use. The both effective and economic process is suitable for eliminating the aerosols, particularly the organic aerosols, present in the waste gas.

16 Claims, 2 Drawing Sheets

PROCESS FOR CLEANING THE WASTE GAS FROM DRYING PROCESSES USING HEATED GAS

BACKGROUND OF THE INVENTION

FIELD OF THE INVENTION

This invention relates to a process for cleaning the waste gas from drying processes using heated gas for products containing volatile ingredients, more particularly for cleaning the waste gas accumulating in the spray drying of surfactant-containing materials, such as detergent slurries.

More particularly, the invention relates to, but is not confined to, the industrial production of surfactants and detergents by drying of a slurry in spray drying towers. The slurry is sprayed through nozzles into the drying zone and dried with the hot gas stream flowing in co-current or countercurrent. The drying gas used is generally air taken in from the surrounding atmosphere which is mixed with the waste gas of a burner and thus heated. Accordingly, the drying gas contains the water from the ambient air and the water formed during the combustion process.

However, the invention is not confined to a particular type of drying gas. It may consist of air or other gases, for example superheated steam.

The drying of products containing volatile ingredients removes not only water, but also relatively large or relatively small amounts of the volatile components, depending on the drying temperature. In the production of detergents by drying of a water-containing paste, the slurry, the volatile components are mainly organic substances, for example nonionic surfactants in the form of fatty alcohols with low degrees of ethoxylation and unsulfonated fatty alcohols in fatty alcohol sulfates. They are present in gaseous form or in the form of extremely fine condensation aerosols in the waste gas of the installations used for drying, for example spray dryers. The aerosols frequently have concentrations of the order of 100 ppm in the waste gas. On account of their extremely small particle size, they cannot be separated to a satisfactory extent by the textile filters or cyclones normally used to clean waste gases from drying installations and, accordingly, pass to the outside with the waste gas stream. Separation of the aerosols by textile filters, even to a small extent, is actually a disadvantage because the filters become blocked and have to be changed after a relatively short time. The waste gas emission produced by the aerosols, which is brought about above all by the steam volatility of certain components of the slurry, is known as "pluming".

DISCUSSION OF RELATED ART

Numerous solutions have been proposed in the prior art for reducing unwanted pluming. The temperature of the drying gas can be reduced, the final water content of the dried product can be kept high and, in addition, drying can be carried out on the countercurrent principle. However, these variants reduce the efficiency of the drying installation, affect product quality and limit the process control possibilities. Another known method of reducing pluming is to modify the composition of the slurry. The disadvantage of this is that the optimal formulation has to be changed.

It has also been proposed to condense the gaseous organic constituents in a washer-cooler. Unfortunately, washing the waste gas in this way is uneconomical on account of the high throughput of drying air which is in excess of 100,000 m³/h. In addition, the environment problem is merely shifted from the waste air to the wastewater.

It is generally not possible to use a countercurrent ionization washer for cleaning waste air in view of the high moisture content.

Another known method of eliminating aerosols is to burn the waste air. However, this involves the additional consumption of energy which can be higher than the energy consumption of the actual drying process.

To summarize, it may be said that the known methods for reducing or eliminating pluming are complicated and expensive.

Accordingly, the problem addressed by the present invention was to provide an effective and economic process of the type mentioned at the beginning for eliminating the aerosols, particularly the organic aerosols, present in the waste gas.

DESCRIPTION OF THE INVENTION

According to the invention, the solution to this problem is characterized in that the waste gas is cooled, the condensate obtained is subjected to crossflow membrane filtration, part of the cleaned waste gas is returned to the drying process and the concentrate obtained is put to a material, thermal or other use.

According to the invention, the waste gas is cooled within the drying installation. This is deliberately avoided in known processes to avoid problems with condensate separated from the waste gas. Cooling has only ever been carried out to recover the waste heat. In the process according to the invention, cooling of the waste gas leads to partial condensation of and an increase in the aerosols which are separated from the waste gas in following aerosol separators. In the case of organic water-insoluble aerosols, an oil-in-water emulsion generally accumulates in the separators. It is subsequently treated by the membrane process mentioned. Only a small quantity of concentrate is left as residue.

The cleaned waste gas, which only contains extremely small quantities of aerosols, is returned to the drying process. There are no unwanted problems with carbon dioxide, which can react undesirably for example with basic ingredients of the material to be dried. This is because a large part of the carbon dioxide dissolves in the aqueous phase of the condensate and is removed with it from the waste gas stream.

In one advantageous embodiment of the process according to the invention, water is finely sprayed in to cool the waste gas. The accompanying saturation with steam is known as "quenching" and must not be confused with the washing of a waste gas which would be uneconomical in view of the normally relatively large quantities of waste gas of the order of 100,000 m³/h or more.

The waste gas may be cooled in various ways. Thus, in a first embodiment of the invention, the waste gas is cooled by surface condensers. The condensate accumulating, which again is generally an emulsion, is after-treated in the same way as described above.

It has proved to be particularly favorable to cool the waste gas by at least 40° C.

If the waste gas is cleaned by passage through textile filters, as is standard practice in the prior art, clogging of the filter can be prevented by cooling the waste gas only after it has passed through the textile filter because the aerosols, which are still very small before cooling, readily pass through the filter.

The waste gas contains only a small amount of aerosols after cooling and separation of the condensate. In one advantageous embodiment of the invention, the aerosol component of the waste gas can be reduced particularly effectively by adding fresh air to part of the cleaned waste gas and delivering the mixture to the burner of the drying installation. In this case, the small residues of organic aerosol constituents still present in the cleaned waste gas burn substantially completely. A high percentage of the recycled waste gas in the combustion air leads to a particularly favorable cleaning result. This percentage may be up to about 90% of the combustion air.

The recycling of the uncleaned waste gas to the drying zone is basically known as "recirculating air drying". According to the present invention, however, the waste gas is only recycled after the removal of aerosol constituents.

The condensate accumulating in the process according to the invention is worked up by crossflow membrane filtration. Organic or inorganic microfiltration or ultrafiltration membranes are generally suitable, depending on the composition of the emulsion. It is of particular advantage, especially from the economic point of view, to use a microfiltration membrane.

The permeate obtained, which is also called the filtrate, has such low wastewater values that it can generally be safely discharged into the main drainage system. However, if greater purification of the permeate is required, it is proposed to purify the permeate obtained from the crossflow membrane filtration by nanofiltration or reverse osmosis. Alternatively or in addition, the permeate may be aftertreated with an oxidizing agent, for example peroxide, UV light or ozonization. Another possibility is to subject the permeate to biological purification. The biological purification stage may be a central sewage treatment plant or a decentralized bioreactor.

The concentrate (retentate) from the crossflow membrane filtration is preferably put to a material use. If this is not possible, it is disposed of, for example by burning.

The process according to the invention may be used on the one hand in closed drying installations operated, for example, with superheated steam or with ambient air. After the condensation stage, there remains only a relatively small and non-condensible quantity of waste air which, in this case, is completely or substantially completely recycled. Although the waste air emission plays only a small part in this case, the aerosol constituents of the circulated drying gas have to be continuously removed to stop any increase in concentration. The invention affords a particularly economic possibility in this regard. Accordingly, it is proposed to apply the process to waste gas from drying installations using circulated drying gas.

The advantages of the invention become particularly clear when the process is applied to waste gas issuing from open drying installations. Particularly serious waste air emission problems have been encountered in such installations in the prior art, but are solved economically and effectively in accordance with the present invention.

DESCRIPTION OF THE DRAWING

One embodiment of the invention is described by way of example in the following with reference to the accompanying drawings, wherein.

Figure 1:
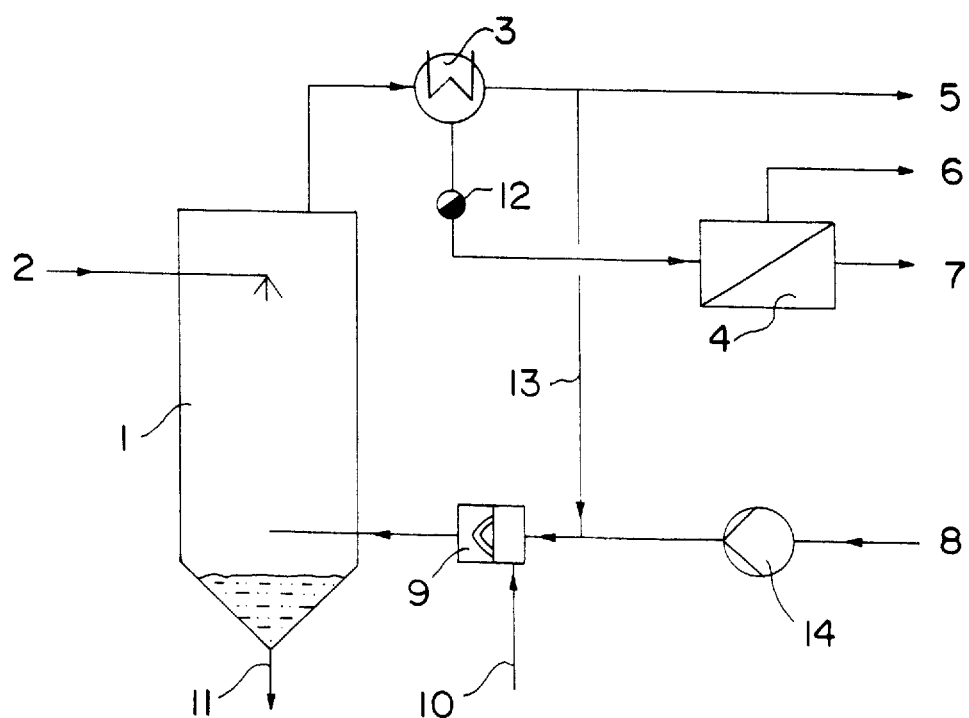
FIG. 1 is a flow chart of an industrial embodiment of the invention.

A spray drying process operated with the waste air treatment according to the invention is illustrated in FIG. 1. For spray drying in a spray drying tower 1 operated with air as the drying gas, a detergent slurry is delivered through a pipe 2 and sprayed through nozzles into the drying zone of the spray drying tower 1. The waste air is cooled in a surface condenser 3 or by spraying in water, most of the aerosols being separated. The emulsion obtained from the condensate separator 12 consists of the water formed by condensation and organic substances. It is delivered to a membrane filtration unit 4 from which a concentrate (retentate) 6 and a filtrate (permeate) 7 is obtained.

Part of the cleaned waste air 5 is passed to the outside. The other part is added through a pipe 13 to the fresh air 8 of the burner 9 which is taken in by a blower 14. The residues of organic aerosols still present in this part of the cleaned waste air burn together with the combustible gas 10 in the burner 9. The dried product may be removed through a discharge pipe 11 at the cone of the spray drying tower 1.

EXAMPLES

Figure 2:
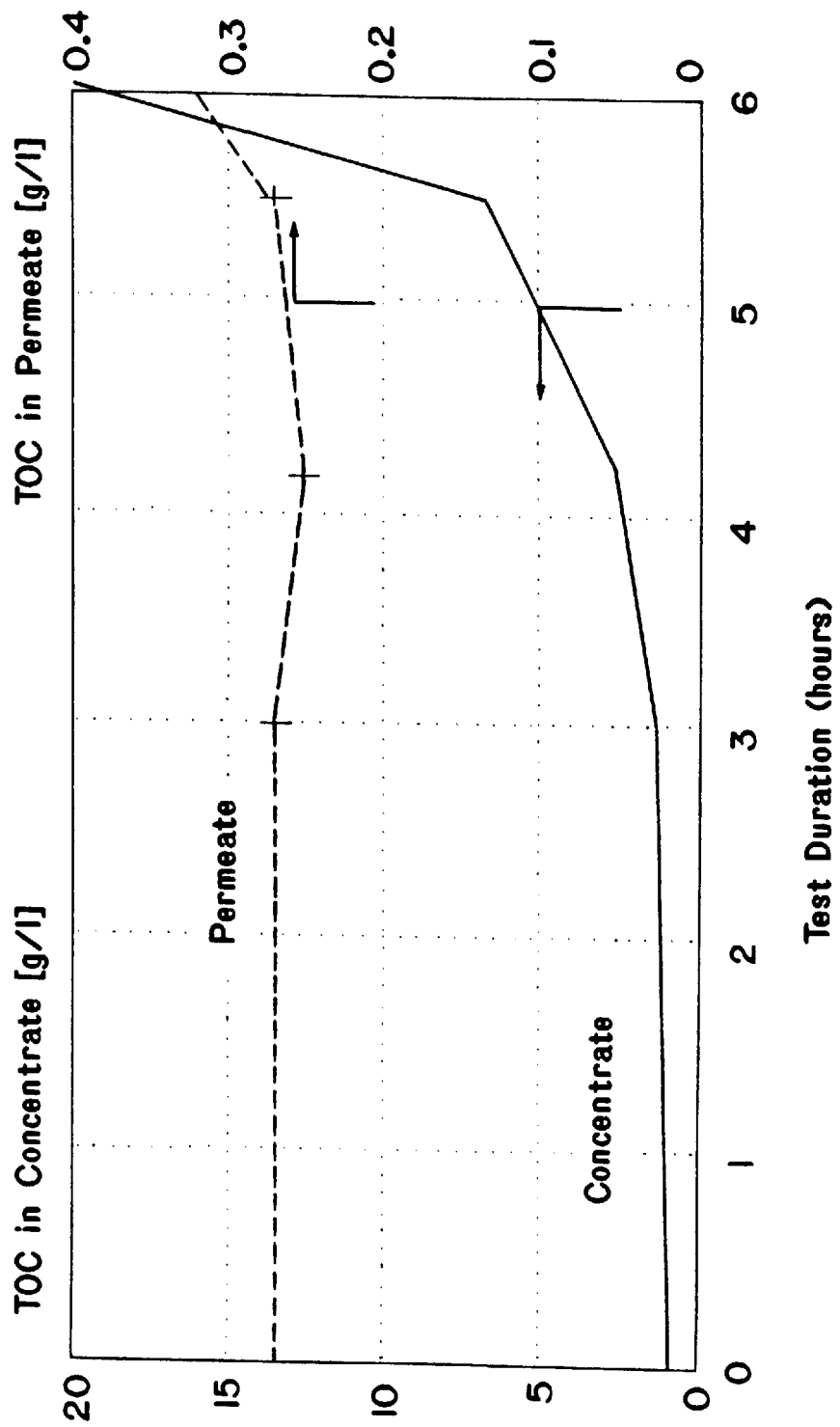
FIG. 2 is a graph illustrating test results.

FIG. 2 shows the results of the membrane filtration of a corresponding condensate. The emulsion was very stable and could not be broken in a centrifuge.

A ceramic membrane with a pore width of 0.14 micrometer ("Carbosep M14", a product of Rhone Poulenc) was used in the test. The membrane stage was operated in batches, i.e. the concentrate was returned to the storage vessel for starting material. The trend of the TOC values in g/l of the concentrate and permeate over the duration of the test in hours is shown in FIG. 2. After a test period of 6 hours, around 25 kg of concentrate with a TOC value of around 20 g/l were obtained from around 900 kg of emulsion with a TOC value of about 1 g/l. Despite this high concentration, the TOC value of the permeate was less than 0.32 g/l.

This shows that the wastewater accumulating in the cleaning of waste air in accordance with the invention can be simply and inexpensively conditioned and that a permeate suitable for discharge into the main drainage system is obtained. In addition, this ensures that the solution to the waste air problem does not give rise to a wastewater problem.

List of Reference Numerals
1. Spray drying tower
2. Pipe
3. Surface condenser
4. Membrane filtration unit
5. Cleaned waste air
6. Concentrate (retentate)
7. Filtrate (permeate)
8. Fresh air
9. Burner
10. Combustible gas
11. Discharge pipe
12. Condensate separator
13. Pipe
14. Blower

What is claimed is:

1. The process of cleaning a waste gas containing volatile components obtained from a drying process using a heated gas to dry a composition containing volatile components, comprising cooling said waste gas to form a condensate whereby at least a part of said volatile components are separated from said waste gas and become part of said condensate, subjecting said condensate to crossflow membrane filtration to obtain a retentate and a filtrate, returning part of said waste gas to the drying process, and disposing of the retentate.

2. A process as in claim 1 wherein said cooling is conducted by spraying said waste gas with water.

3. A process as in claim 1 wherein said cooling is conducted by contacting said waste gas with a surface condenser.

4. A process as in claim 1 wherein the waste gas to form a condensate is cooled by at least 40° C.

5. A process as in claim 1 including cleaning the waste gas by passing the waste gas through textile filters, and then cooling the waste gas.

6. A process as in claim 1 wherein after forming said condensate, the further step of adding fresh air to part of the waste gas and delivering the mixture to a burner means of a drying apparatus.

7. A process as in claim 1 wherein said crossflow membrane filtration is conducted with a microfiltration membrane.

8. A process as in claim 1 including purifying said filtrate by nanofiltration or by reverse osmosis.

9. A process as in claim 1 including treating said filtrate with an oxidizing agent.

10. A process as in claim 1 including biologically-purifying said filtrate.

11. A process as in claim 1 wherein said waste gas is obtained from a drying process using a heated gas.

12. A process as in claim 1 wherein said waste gas is obtained from an open drying apparatus.

13. A process as in claim 1 wherein said composition comprises a surfactant-containing composition .

14. A process as in claim 13 wherein said surfactant-containing composition comprises a detergent slurry.

15. A process as in claim 1 wherein said heated gas comprises heated air.

16. A process as in claim 1 wherein said heated gas comprises superheated steam.

* * * * *